United States Patent [19]

Delaney

[11] Patent Number: 4,532,117
[45] Date of Patent: Jul. 30, 1985

[54] METHOD FOR RECONDITIONING BACTERIA-CONTAMINATED HYDROGEN SULFIDE REMOVAL SYSTEMS

[75] Inventor: Dennis D. Delaney, Placentia, Calif.

[73] Assignee: Union Oil Company of California, Los Angeles, Calif.

[21] Appl. No.: 565,113

[22] Filed: Dec. 20, 1983

[51] Int. Cl.³ ............... B01D 53/34; C01B 17/05; C09K 3/00
[52] U.S. Cl. .................... 423/226; 423/573 R; 210/764; 252/189; 252/191
[58] Field of Search ........ 423/224, 226, 573.6, 423/573 R; 210/764; 252/189–191

[56] References Cited

U.S. PATENT DOCUMENTS

| | | | |
|---|---|---|---|
| 2,801,216 | 7/1957 | Yoder et al. | 424/333 |
| 2,987,475 | 6/1961 | Legator | 282/8.55 |
| 3,049,492 | 8/1962 | DeGroote et al. | 252/8.55 |
| 3,329,610 | 7/1967 | Kreuz et al. | 252/8.55 |
| 3,714,100 | 1/1973 | Biale et al. | 260/29.6 TA |
| 4,206,194 | 6/1980 | Fenton et al. | 423/573 R |
| 4,393,037 | 7/1983 | Delaney et al. | 423/573 R |

OTHER PUBLICATIONS

"Refiners Focus on Sulfur Recovery," *Oil & Gas Journal,* Jun. 28, 1982.
"First Commercial Test is Successful for Catalytic Hydrogen Sulfide Oxidation Process," A. J. Cabodi, H. R. Van and L. C. Hardison, *Oil & Gas Journal,* Jul. 5, 1982.
U.S. application Ser. No. 441,669, 11-15-82, Delaney et al.
U.S. application Ser. No. 447,227, 12-6-82, Delaney et al.

*Primary Examiner*—Earl C. Thomas
*Attorney, Agent, or Firm*—Dean Sandford; Gregory F. Wirzbicki; Michael C. Schiffer

[57] ABSTRACT

A method, applicable to hydrogen sulfide removal systems which employ a regenerable aqueous washing solution capable of absorbing hydrogen sulfide and converting that hydrogen sulfide to elemental sulfur, is provided for reconditioning such systems after they have become contaminated with sulfur-feeding bacteria and/or for maintaining such systems substantially free of such bacteria. In the method of the invention, the aqueous washing solution is contacted with an aliphatic dialdehyde.

18 Claims, 1 Drawing Figure

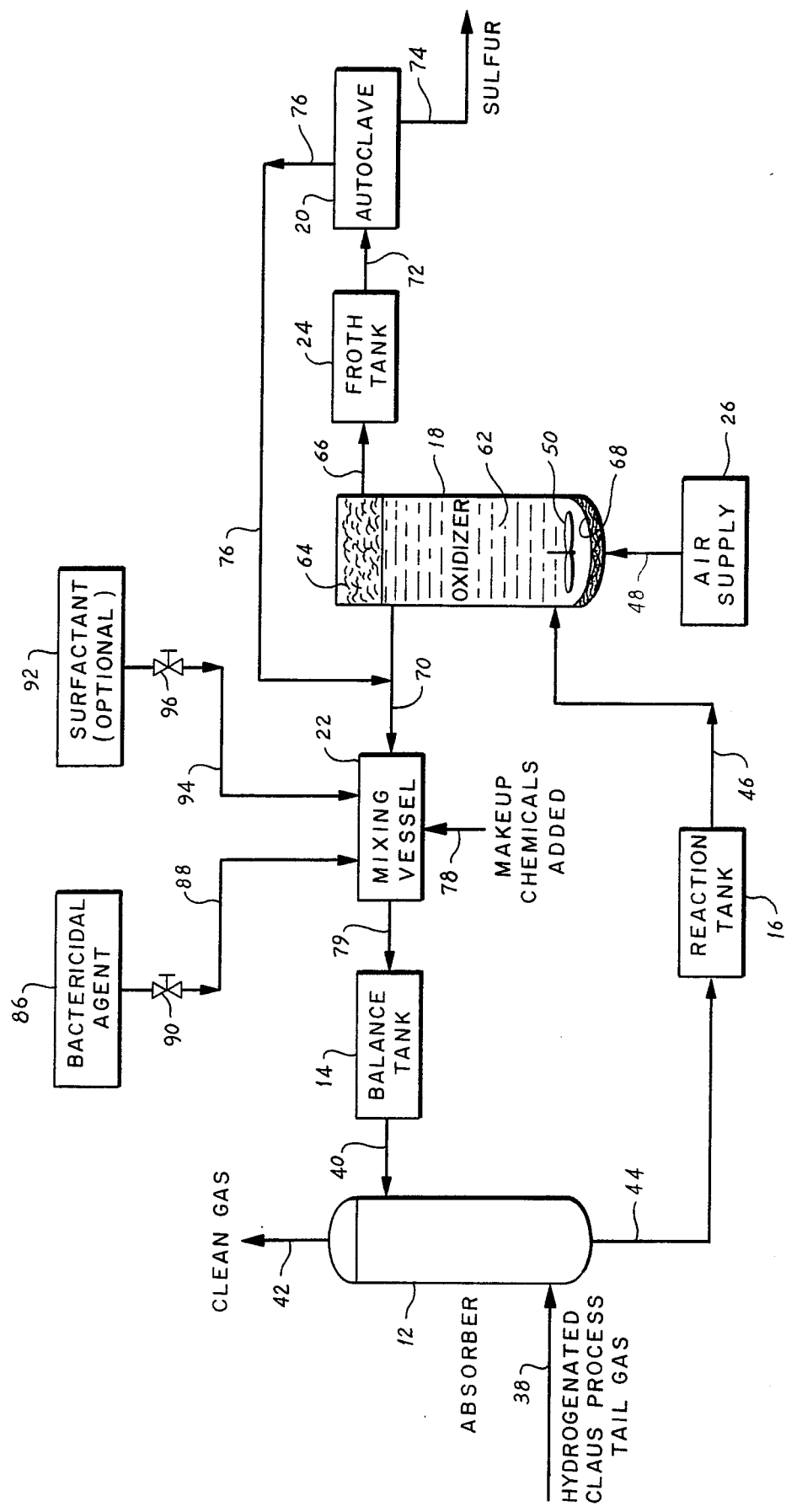

METHOD FOR RECONDITIONING BACTERIA-CONTAMINATED HYDROGEN SULFIDE REMOVAL SYSTEMS

BACKGROUND OF THE INVENTION

The present invention relates generally to the removal of hydrogen sulfide from gas streams by contacting such gas streams with a regenerable, aqueous washing solution. More particularly, the present invention relates to the reconditioning of such a washing solution after it has become contaminated with sulfur-feeding bacteria and/or to the maintenance of such a washing solution in a substantially bacteria-free condition.

With the increasing concern over atmospheric pollution and the concomitant increasingly strict enforcement of tight air pollution standards, ever greater responsibility is placed on industry to produce pollution-free products in a non-polluting manner. An area of particular environmental concern has been, and is, the discharge or release of sulfur and its compounds, especially hydrogen sulfide, into the atmosphere as a result of various industrial processes. These processes include, for example, petroleum refining, the sweetening of sour natural gas, destructive distillation of coal and oil shale, gasification or liquefication of coal and production and use of hydrogen sulfide-containing geothermal steam and liquid for generating electricity or for other uses.

Several processes have been developed, and are in relatively common use, for removing hydrogen sulfide from gas streams such as those generated and/or encountered in the industrial processes listed above. Such hydrogen sulfide removal processes as the Stretford and the Takahax processes, employ an aqueous, alkaline washing solution to absorb hydrogen sulfide from a gas stream, for example, a tail gas from a Claus apparatus. Vanadates in the washing solution convert the hydrogen sulfide to elemental sulfur, which is then removed in particulate form from the washing solution. The sulfur removal may be accomplished in an autoclave in which small sulfur particles are agglomerated for removal purposes. Washing solutions employed in these hydrogen sulfide removal processes are typically regenerated for reuse by injecting air into and through the solutions, the oxygen contained in the air reoxidizing the vanadate or other metal compound used.

By way of background, the washing solution employed in the Stretford process contains a water-soluble salt of 9,10 anthraquinone disulfonic acid (ADA) and a water-soluble vanadate (or other multivalent metal) compound. The Takahax process, in contrast, uses a washing solution containing a water-soluble naphthaquinone sulfonate (NQS), alone or in combination with a multivalent metal compound. The hydrogen sulfide removal process disclosed in Fenton et al. U.S. Pat. No. 4,283,379 employs a washing solution containing solubilized vanadium, one or more water-soluable non-quinone aromatic compounds, thiocyanate ions and a water-soluble carboxylate complexing agent.

It is known in the petroleum industry that certain types of bacteria which live on sulfur can cause serious problems in those petroleum operations in which sulfur and/or sulfur compounds are present. Kreuz et al., U.S. Pat. No. 3,329,610 for example, discusses the bacterial problems encountered in secondary oil recovery operations employing water flooding or injection. Sulfur-feeding bacteria in these secondary oil recovery operations have been found to cause severe corrosion of metal equipment and, when present in sufficiently large numbers, to cause plugging of pores in the associated oil bearing earth formations. The two classes of bacteria believed responsible for these problems are identified in the Kreuz et al. patent as Disulforibrio desulfuricans (sulfate reducers), an anerobe, and Pseudomonas, an aerobe.

Recently, sulfur-feeding bacteria have been discovered in certain hydrogen sulfide gas removal systems, namely Stretford process systems. Although some hydrogen sulfide washing solutions, such as those disclosed in the above-cited patent to Fenton et al., are considered hostile to living organisms because they contain thiocyanate compounds, other hydrogen sulfide washing solutions, such as those used in the Stretford process, appear to support the growth of at least some types of sulfur-feeding bacteria. The Stretford process washing solutions, because of their hot, aqueous nature, appear to promote the breeding of sulfur-feeding bacteria to an extent that severe problems with hydrogen sulfide removal may result.

In specific respect to the observed sulfur bacteria problems in Stretford process washing solutions, bacteria entering the elemental sulfur-removing autoclave are apparently killed by the increased temperature encountered in the autoclave. After being killed, however, the dead bacteria have been found to remain adhered to the sulfur particles on which they had been feeding and thereby form a coating which prevents the sulfur particles from agglomerating in the normal manner required for sulfur removal. As a consequence, the sulfur particles are recirculated with the washing solution from the autoclave back into the rest of the system and interfere with the hydrogen sulfide gas removal process.

The living bacteria in the system, particularly in the solution regeneration (vanadate reoxidation) vessel, have been found to produce large amounts of slime and to cause excessive solution frothing, both effects inhibiting the solution regeneration process. Since oxygen and elemental sulfur are present in the regeneration vessel, the vessel is considered a good breeding ground for the sulfur-feeding bacteria, the bacteria being bred in the vessel at a faster rate than bacteria are killed in the autoclave. Since the washing solution is also recirculated from the regeneration vessel, sulfur-feeding bacteria are continually circulated through the entire system from the vessel.

Due to the effects of the sulfur-feeding bacteria, the hydrogen sulfide removal capacity of the washing solution rapidly decreases as the bacterial contamination increases. As a result, the industrial process with which the hydrogen sulfide removal process is associated must usually be curtailed with production being lost and/or production costs being increased.

Until recently, degradation of hydrogen sulfide washing solutions has not been attributed to sulfur-feeding bacteria. Most attempts to alleviate problems of washing solution degradation are believed to have involved replacing only a portion of the degraded washing solution with fresh washing solution. However, in the case of bacterial contamination of the washing solution, replacement of only a portion of the washing solution would result in bacterial contamination of the newly added solution, and any beneficial effects of adding the fresh solution would be only temporary.

Since hydrogen sulfide removal systems, such as Stretford process systems, typically employ between about 100,000 and 500,000 gallons of washing solution, total washing solution replacement is relatively costly. Substantial additional costs may be associated with disposal of the replaced washing solution. As a result, replacement of the entire washing solution is not economically attractive, even if it were possible to clean the system sufficiently to remove all traces of bacteria which could cause infestation of the replacement washing solution. Also, considerable down time would be required for the cleaning operation.

In respect to known sulfur feeding bacterial problems associated with water flooding or injection for secondary oil recovery, the above-identified patent to Kreuz et al., as well as U.S. Pat. Nos. 2,987,475 and 3,049,492 to Legator and DeGroote et al., respectively, disclose use of specific bactericides with which the water may be treated as a preventative measure. Use of peracetic acid, olefinically unsaturated lower alkyl aldehydes and certain oxirane ring containing compounds as bactericides are disclosed in the patents mentioned above. However, none of these disclosed bactericides is considered adaptable for use in hydrogen sulfide washing solutions, because none of these bactericides is chemically stable at the conditions existant within typical hydrogen sulfide washing solutions. In such washing solutions each of these bactericides rapidly reacts with chemical constituents present in the washing solution, thereby decomposing into less bactericidally active materials. Peracetic acid, for example, reacts with hydrogen sulfide and the reduced form of the multivalent metal ion ($V^{+4}$ in Stretford solutions) to form relatively bactericidally inactive acetic acid. Olefinically unsaturated lower alkyl aldehydes react with gaseous oxygen to form bactericidally active peracids but, as is the case with peracetic acid, these peracids react with hydrogen sulfide and the reduced form of the multivalent metal to form relatively bactericidally inactive organic acids. Oxirane rings react with water to form relatively bactericidally inactive glycols.

A significant aspect of the problem of bacterial contamination or infestation of hydrogen sulfide removal systems, such as Stretford process systems, is that the contamination problem is not universal but seems to occur only in some hydrogen sulfide removal systems. Although the bacterial contaminations appear most often in systems located in hot, moist climates, as may be found, for example, around the Gulf of Mexico in the United States, not all similar systems in this type climate become contaminated. Furthermore, the bacterial infestations appear to be cyclic in nature and may be dependent upon as yet unknown cyclic characteristics of the bacteria. As a result, even after the bacterial nature of the hydrogen sulfide removal process has been identified, universally applied preventive techniques do not appear economically feasible.

An important need therefore exists for an effective economical method for reconditioning hydrogen sulfide removal systems which have become infested or contaminated by sulfur-feeding bacteria to an extent that effectiveness of the hydrogen sulfide removal system is substantially impaired.

Accordingly, it is a principal object of the present invention to provide a method for reconditioning hydrogen sulfide removal systems and washing solutions which have become badly infested with sulfur-feeding bacteria.

Still another object of the invention is to prevent subsequent bacterial reinfestation of the hydrogen sulfide removal system and washing solution by the sulfur-feeding bacteria after the system and solution have been reconditioned.

Further objects, advantages and features of the invention will become apparent to those skilled in the art from the following description when taken in conjunction with the accompanying drawing.

SUMMARY OF THE INVENTION

In accordance with the present invention, a method, applicable to hydrogen sulfide gas removal systems which utilize a regenerable, aqueous washing solution capable of absorbing hydrogen sulfide and converting that hydrogen sulfide to elemental sulfur, is provided for reconditioning such systems after they have become contaminated with living, sulfur-feeding bacteria and/or for maintaining such systems substantially bacteria-free. The reconditioning method comprises contacting the aqueous solutions of such systems with an aliphatic dialdehyde of the form:

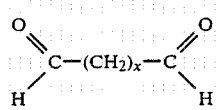

where x is an integer.

The method of this invention reconditions a hydrogen sulfide removal system and washing solution employed therein by destroying sulfur-feeding bacteria contaminating the system and solution. The method also prevents recontamination of the system and washing solution by unkilled bacteria left in the solution or by live bacteria entering the solution from the outside.

Also in accordance with the present invention, a composition of matter is provided comprising an aqueous liquid capable of absorbing hydrogen sulfide and converting that hydrogen sulfide to elemental sulfur and an aliphatic dialdehyde of the form:

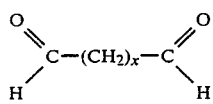

where x is an integer.

BRIEF DESCRIPTION OF THE DRAWING

The present invention will be more readily understood by reference to the drawing, in which is depicted an exemplary hydrogen sulfide gas removal system with which the present reconditioning method may be used to advantage.

DESCRIPTION OF THE PREFERRED EMBODIMENT

The reconditioning method of the present invention is suitable for use with a wide variety of hydrogen sulfide removal systems and the washing solutions employed therein. Although, for illustrative purposes, the method is hereinbelow described in particular respect to reconditioning a Stretford process system employing an aqueous, alkaline washing solution containing a water-soluble vanadate and water-soluble anthraquinone disulfonic acid (ADA), it is to be understood that the method is not so limited but is also applicable to other hydrogen sulfide removal systems employing washing solutions which promote the growth of sulfur-feeding bacteria.

The term "sulfur-feeding bacteria" is used herein for convenience and is to be attributed a broad meaning so as to include bacteria or living microorganisms of any type that act detrimentally on or with sulfur, regardless of the particular mechanism involved. For example, a sulfur-carbon transfer is believed associated with at least some types of bacteria which are considered to be sulfur-feeding within the broad definition of the term. Carbon from the solution, presumably from carbonates, is ultimately absorbed by these bacteria for cell building needs. In the transfer process, sulfur is converted to sulfates, which may additionally inhibit the hydrogen sulfide removal capacity of the system.

For a better understanding of the invention, the drawing depicts an exemplary Stretford process system, into which, in accordance with the invention, a bactericide is added after the system has become contaminated with sulfur-feeding bacteria. Shown generally comprising the system are absorber vessel 12, balance tank 14, reaction tank 16, oxidizer vessel 18 and autoclave 20. Also included are mixing vessel 22, froth tank 24 and air supply 26.

A hydrogen sulfide-containing gas stream, for example a Claus process tail gas stream, flows into lower regions of absorber vessel 12 through conduit 38. Typically, the gas stream contains between about 0.5 and about 5.0 mole percent of hydrogen sulfide. From balance tank 14, hydrogen sulfide washing solution flows into upper regions of absorber vessel 12 through conduit 40. A pump, not shown, may be used to pump the washing solution from tank 14 into vessel 12.

Within vessel 12, which may contain a number and/or variety of baffle plates, not shown, the hydrogen sulfide gas-containing stream from conduit 38 rises towards the top of vessel 12 in counter-flow with the downwardly flowing washing solution introduced from conduit 40. As a result of this counter-flow, and preferably intermixed flow, of gas and washing solution through vessel 12, hydrogen sulfide is extracted from the gas by the washing solution and is carried along therewith. Alternatively, one or more venturi or other gas-liquid contacting apparatus may be employed in conjunction with, or in replacement of, absorber 12.

Sodium carbonate may be utilized in the washing solution to react with the hydrogen sulfide from the gas stream in vessel 12 to form sodium hydrosulfide according to the following reaction:

$$H_2S + Na_2CO_3 \rightarrow NaHS + NaHCO_3 \quad (1)$$

In turn, the sodium hydrosulfide is oxidized to elemental sulfur by the water-soluble vanadate in the solution according to the reaction:

$$NaHS + NaHCO_3 + 2NaVO_3 \rightarrow S + Na_2V_2O_5 + Na_2CO_3 + H_2O \quad (2)$$

The hydrogen sulfide stripped gas is vented from the top of absorber vessel 12 through conduit 42, venting being normally into the atmosphere. The washing solution is discharged from the bottom of vessel 12 through conduit 44 into reaction tank 16 where further and complete chemical conversion to elemental sulfur, in accordance with reaction (2), occurs. The washing solution and gas stream residence time in vessel 12 typically varies between about 10 and 15 minutes.

The sulfur-containing washing solution flows from reaction tank 16 through conduit 46 into the lower regions of oxidizer vessel 18. A pump (not shown) is used to pump the solution from tank 16 into oxidizer vessel 18. Air is injected into the bottom of oxidizer vessel 18 from air supply 26, through conduit 48, and is preferably churned into a large number of small bubbles by rotating stirrer-mixer 50 located above the air inlet. These air bubbles rise through the solution in oxidizer vessel 18, thereby reoxidizing the solution, which was chemically reduced in absorber vessel 12 and reaction tank 16, to its initial state. Thus, the vanadium, which by reaction (2) had been reduced from its pentavalent state to the quadravalent state ($V^{+5}$ to $V^{+4}$), is oxidized in oxidizer vessel 18 by the upwardly flowing air from source 26, back to its original pentavalent state, the ADA in the washing solution acting as a catalyst. The reaction involved is:

$$Na_2V_2O_5 + \tfrac{1}{2}O_2 \xrightarrow{ADA} 2NaVO_3 \quad (3)$$

In this manner, the washing solution is regenerated in oxidizer vessel 18 for reuse in the system.

Most of the elemental sulfur in oxidizer vessel 18 rises to the top of the washing solution, identified generally as 62, and forms a froth 64 on top of solution 62. This sulfur froth 64 is withdrawn, accompanied by a small amount of regenerated washing solution, through conduit 66 to froth tank 24. Some of the sulfur in oxidizer vessel 18, however, settles to the bottom of the vessel to form sulfur layer 68. The reconditioned washing solution, with the exception of that amount discharged with sulfur froth 64 into conduit 66, is discharged through conduit 70 to mixing vessel 22.

From froth tank 24 the elemental sulfur and washing solution are discharged through conduit 72 into autoclave 20. The sulfur, discharged into autoclave 20 as small particles, is agglomerated at an elevated temperature and then drawn off from bottom regions of autoclave 20 through conduit 74. The washing solution is recirculated from autoclave 20 through conduit 76, which is connected into conduit 70 between oxidizer vessel 18 and mixing vessel 22.

Make-up chemicals, such as ADA and vanadate, are added to the washing solution in mixing vessel 22 via conduit 78 in amounts required to maintain the desired concentration levels in the washing solution. From mixing vessel 22, the washing solution, which is largely regenerated solution from oxidizer vessel 18, is discharged through conduit 79 to balance tank 14. As peviously described, the washing solution from balance tank 14 is discharged into absorber vessel 12 through conduit 40, thereby completing the washing solution recirculation loop.

When the system becomes contaminated or infested with sulfur-feeding bacteria, the bacteria tend to become concentrated in sulfur froth 64 in oxidizer vessel 18 and are discharged with the sulfur through froth tank 24 into autoclave 20, wherein most of the bacteria are killed at the higher autoclave temperature. The dead bacteria, however, adhere or remain attached to the sulfur particle surfaces and thereby prevent the agglomeration of the particles required for sulfur removal. As a result, the sulfur particles remain in suspension in the washing solution and are recirculated from autoclave 20 with the washing solution through conduit 76.

The sulfur layer 68 at the bottom of oxidizer vessel 18 also provides a rich breeding ground for the bacteria, and indeed, bacteria in the sulfur layer tend to reproduce at a faster rate than that at which bacteria are removed with sulfur froth 64. As a consequence, the bacteria population in the system increases rapidly after intitial system contamination by the bacteria.

Apparently as the result of the bacteria breeding in oxidizer vessel 18, in particular in sulfur layer 68, an excessive amount of sulfur frothing occurs and large amounts of slime are formed in oxidizer vessel 18. Both the excessive sulfur frothing and slime formation inhibit the solution regeneration (vanadium reoxidation) reaction in oxidizer vessel 18, thereby degrading the effectiveness of the washing solution. In addition, some of the excessive sulfur froth and slime formed in the upper regions of oxidizer vessel 18 are recirculated with the washing solution back upstream through mixing vessel 22 and balance tank 14 into absorber vessel 12 and therein inhibit the hydrogen sulfide removal process.

As a result of bacterial growth and increasing bacterial contamination, the effectiveness of the washing solution for removing hydrogen sulfide from the gas stream entering absorber vessel 12 through conduit 38 diminishes, often at a quite rapid rate. This degradation of the system in turn requires curtailment of the associated industrial process from which the hydrogen sulfide-containing gas stream is received in order that allowable hydrogen sulfide emission levels not be exceeded.

The present method reconditions the washing solution throughout the entire system during operation, and the system is returned to normal operation without necessity for washing solution replacement.

Accordingly, the reconditioning method comprises adding a bactericidal agent comprising an aliphatic dialdehyde of the form:

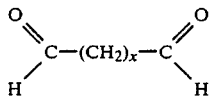

where x is an integer from 0 to about 10, into the bacteria-contaminated washing solution in an amount and at a rate which destroys all or substantially all of the sulfur-feeding bacteria in the entire system. As shown in the Drawing, source 86 of the bactericidal agent discharges into mixing vessel 22 through conduit 88 so as to enable intimate mixing of the bactericidal agent with the washing solution. Valve 90 in conduit 88 enables control of the amount of bactericidal agent added from source 86 into mixing vessel 22. Less preferably, source 86 may alternatively be flow connected into balance tank 14 or into oxidizer vessel 18.

The normal recirculating flow of washing solution from mixing vessel 22 rapidly and thoroughly distributes the bactericidal agent throughout the system, thereby causing rapid destruction of the sulfur-feeding bacteria. As above-mentioned, however, the dead bacteria may tend to cling to the surface of sulfur particles on which they were feeding and so inhibit sulfur particle agglomeration in, and hence sulfur removal from, autoclave 20. In consequence, the sulfur and dead bacteria may be recirculated through the system from autoclave 20 so as to inhibit the hydrogen sulfide removal process. Thus, although addition of the bactericidal agent to mixing vessel 22 prevents further degradation of the hydrogen sulfide removal process in the system, the bactericidal agent may not by itself recondition the system to its pre-bacterial contamination effectiveness. In such cases, the practioner may find it helpful to add a surfactant. As shown in the Drawing, source 92 of surfactant is flow-connected into mixing vessel 22 by conduit 94. Valve 96 in conduit 94 controls the flow of surfactant, if any, from source 92 into mixing vessel 22. Surfactant from source 92 may alternatively, but less preferably, be added into balance tank 14 or oxidizer vessel 18.

Several days of operation are usually required, after addition of the bactericidal agent into mixing vessel 22, before the system is completely reconditioned. During these several days, hydrogen sulfide removal capacity is gradually restored and effectiveness of the system is increased so that any curtailment of the associated industrial process can be reduced. It is emphasized that this system reconditioning is normally accomplished without necessity for replacement of any of the washing solution, although recovery of the system may in some instances be accelerated by accompanying replacement of some of the washing solution.

After the system has been completely reconditioned by addition of sufficient amounts of the bactericidal agent, further addition of bactericidal agent, at least for a period of time assuring that no recontamination occurs by sulfur-feeding bacteria which may have initially escaped destruction, may be desirable. Consequently, the present method optionally includes introduction of additional bactericidal agent from source 86 into the system, preferably into mixing vessel 22. Ordinarily, the rate at which the bactericidal agent is added after the system has been completely reconditioned is less than the rate at which the bactericidal agent is added to achieve system reconditioning. That is, the concentration of bactericidal recontamination of the system will normally be less than that required to recondition the system, particularly when relatively large amounts of bactericidal agent have been used to achieve rapid system reconditioning.

It will be appreciated that the amounts of bactericidal agent required to recondition the system depend upon such factors as the extent of bacterial contamination, the length of time the system has been contaminated, the type of bacteria involved, and the type of hydrogen sulfide removal system.

The bactericidal agent used in this invention comprises one or more aliphatic dialdehydes of the form:

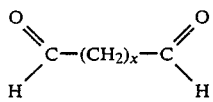

where x is an integer from 0 to about 10. Such bactericidal agents are compatible for use within the aqueous washing solutions of most sulfur removal systems and can be stored and used without being unduly dangerous to human beings.

The preferred bactericidal agents are glyoxal, succinaldehyde, hexa-2,4-dienal, methylglutaraldehyde and adipaldehyde, with glyoxal being most preferred.

Normally the bactericidal agent is added to the washing solution at a concentration of at least about 5 parts per million by weight (wppm) but generally below about 5,000 wppm, according to the extent of the bacterial infestation; a concentration range of between about 10 wppm and about 1000 wppm being preferred, and between about 100 and about 300 wppm being most preferred. The range of about 100 wppm to about 300 wppm is particularly adapted for the maintenance stage after the system and solution have been reconditioned.

If a surfactant is used in this invention, it must be adaptable to sulfur removal systems employing an aqueous washing solution. Accordingly such surfactant preferably comprises a compound selected from the group of surfactants which:
(1) are, at least, partially water soluble;
(2) are substantially stable at the conditions existent within the washing solution;
(3) are substantially innocuous to oxidation of hydrogen sulfide to sulfur;
(4) are substantially innocuous to regeneration of the washing solution with oxygen;
(5) are substantially innocuous to the recovery of product sulfur; and
(6) are substantially nonreactive or decomposable within the washing solution except in cases where essentially all products of such reaction and/or decomposition are substantially innocuous to the environment and substantially innocuous to said hydrogen sulfide removal system.

Also, it is preferable that any bactericidal agent used in this invention can be stored and used without being unduly dangerous to human beings. Because any bacterial coating effect on the sulfur which prevents sulfur particle agglomeration in autoclave 20 tends to be nonionic, a non-ionic surfactant is often preferred. However, ionic surfactants may alternatively be used, although, sometimes with less effectiveness.

Suitable surfactants include polyoxyethylene condensates represented by the following general formula:

$$R-O-(CH_2-CH_2-O)_n-H, \quad (4)$$

wherein R is the residue of a fatty alcohol, acid, amide, or amine having from about 10 to about 18 carbon atoms or an alkyl phenol having from about 10 to about 18 carbon atoms; and where n is an integer of 1 or above and preferably between about 5 and about 30. Some specific examples of polyoxyethylene condensates which can be used are polyoxyethylene aliphatic ethers such as polyoxyethylene lauryl ether, polyoxyethylene oleyl ether, polyoxyethylene hydroabietyl ether and the like; polyoxyethylene alkaryl ethers such as polyoxyethylene nonylphenyl ether, polyoxyethylene octylphenyl ether and the like; polyoxyethylene esters of higher fatty acids such as polyoxyethylene laurate, polyoxyethylene oleate and the like as well as condensates of ethylene oxide with resin acids and tall oil acids; polyoxyethylene amide and amine condensates such as N-polyoxyethylene lauramide N-lauryl-N-polyoxyethylene thioethers such as polyoxyethylene n-dodecyl thioether.

Some other examples of polyoxyethylene ether compounds are polyoxyethylene nonylphenyl ether having a cloud point of between 126° and 133° F. and marketed under the trademark "Igepal CO-630" and a polyoxyethylene nonylphenol ether having a cloud point above 212° F. and marketed under the trademark "Igepal CO-887." A similar polyoxyethylene nonyl-phenyl ether having a cloud point of about 86° F., marketed under the trademark "Igepal CO-610," is also a good surfactant. "Igepals" are marketed by General Aniline and Film Company. Another surfactant is a polyoxyethylene octylphenyl ether having a cloud point of between 80° F. and 160° F. and marketed by Rohm and Haas Company under the trademark "Triton X-100." Other surfactants which may be used include a polyoxyethylene oleyl ether having a cloud point of between 80° F. and 160° F. and marketed by ICI Americas, Inc. under the trademark "Atlas G-3915" and a polyoxyethylene lauryl ether having a cloud point above 190° F. and marketed by Atlas Chemical Industries, Inc. under the trademark "Brij 35."

The nonionic surfactants which can be used also include a group of compounds marketed by Wyandotte Chemicals Corporation under the trademark "Pluronics." "Pluronics" have the following general formula:

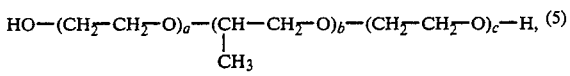

$$HO-(CH_2-CH_2-O)_a-(CH-CH_2-O)_b-(CH_2-CH_2-O)_c-H, \quad (5)$$
$$\phantom{HO-(CH_2-CH_2-O)_a-(}CH_3$$

wherein a, b and c are integers between about 1 and about 100. As the ratio of b to a and c increases, the compounds become less water soluble and more oil soluble, and thus more hydrophobic; in contrast, as the ratio of b to a and c decreases, the compounds become more water soluble and less oil soluble, and thus more hydrophilic. An example of this group of compounds is "Pluronic L-61" which has a polyoxypropylene chain having a molecular weight of about 1,500 to 1,800 and a polyoxyethylene content that is about 5 to 15 percent of the total weight of the molecule. Another example is "Pluronic L-64" which has a polyoxypropylene chain having a molecular weight of about 1,500 to 1,800 and a polyoxyethylene content that is about 35 to 45 percent of the total weight of the molecule. Still another useful example is "Pluronic L-81" which has a polyoxypropylene chain having a molecular weight of about 2,100 to 2,600 and a polyoxyethylene content that is about 5 to 15 percent of the total weight of the molecule. These compounds may be considered to be copolymers of polypropylene and polyethylene oxides.

Still another series of suitable surfactants that can be used are ethylene oxide adducts of acetylenic glycols marketed by Air Products & Chemicals, Inc. under the trademark "Surfynol." "Surfynols" can be represented by the following general formula:

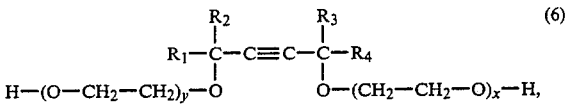

$$\begin{array}{cc} R_2 & R_3 \\ | & | \\ R_1-C-C\equiv C-C-R_4 \\ | & | \\ H-(O-CH_2-CH_2)_y-O \quad O-(CH_2-CH_2-O)_x-H, \end{array} \quad (6)$$

in which $R_1$ and $R_4$ are alkyl radicals containing from about three to about 10 carbon atoms, $R_2$ and $R_3$ are selected from the group consisting of methyl and ethyl, and x and y are integers having a sum in the range of about 3 to about 60.

Representative of the "Surfynols" are "Surfynol 365" which is an ethylene oxide adduct of 2,4,7,9-tetramethyl decynediol containing an average of 10 moles of ethylene oxide per mole of the surfactant. "Surfynol 485" corresponds to "Surfynol 465" but contains an average of 30 moles of ethylene oxide per mole of surfactant. "Surfynol 485" has a cloud point above 212° F.

When used, the surfactant is typically added to the washing solution at a concentration of at least about 10 parts per million by volume (vppm), but generally below about 100,000 vppm, with a preferred concentration range of between about 1,000 vppm and about 5,000 vppm.

The present invention is further illustrated by the following example which is illustrative of various aspects of the invention and is not intended as limiting the scope of the invention as defined by the appended claims.

EXAMPLE

An aqueous washing solution from a commercial Stretford process hydrogen sulfide removal system is found to be contaminated with about $10^7$ live bacteria per milliliter. A sample of this contaminated solution is contacted with glyoxal such that the concentration of glyoxal within the sample is about 400 wppm. The sample is allowed to stand for about 16 hours and is thereafter analyzed for bacteria contamination. The sample is found to contain essentially no live bacteria.

The results of this experiment illustrate the effectiveness of the invention in destroying sulfur-feeding bacteria within the aqueous washing solutions of hydrogen sulfide removal processes.

Although a particular embodiment of the invention has been described, it will, of course, be understood that the invention is not limited thereto, since many obvious modifications can be made, and it is intended to include within this invention any such modification as may fall within the scope of the claims.

Having now described the invention, I claim:

1. A method for reconditioning a hydrogen sulfide removal system which employs a regenerable aqueous washing solution capable of absorbing hydrogen sulfide and converting that hydrogen sulfide to elemental sulfur after the system has become contaminated with sulfur-feeding bacteria and for maintaining such a system in a substantially bacteria-free condition, said method comprising contacting said aqueous washing solution which comprises at least one metal and at least one metal complexing agent with a bactericidal agent comprising an aliphatic dialdehyde of the form:

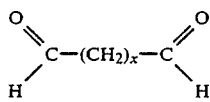

where x is an integer.

2. The method defined in claim 1 comprising the further step of contacting particles of said elemental sulfur with a surfactant adaptable to said hydrogen sulfide removal system.

3. The method defined in claim 2 wherein said surfactant comprises a compound selected from the group consisting of:

(a) a polyoxyethylene condensate represented by the following general formula:

R—O—(CH$_2$—CH$_2$—O)$_n$—H, wherein R is the residue of a fatty alcohol, acid, amide or amine having from about 10 to about 18 carbon atoms or an alkyl phenol having from about 10 to about 18 carbon atoms and where n is an integer of 1 or above;

(b) a compound represented by the following general formula:

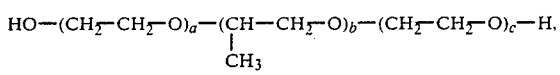

wherein a, b and c are integers between about 1 and about 100; and (c) an ethylene oxide adduct of acetylenic glycols represented by the general formula:

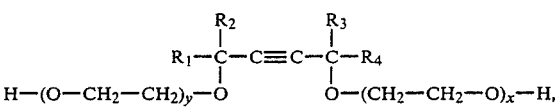

wherein R$_1$ and R$_4$ are alkyl radicals containing from about 3 to about 100 carbon atoms, R$_2$ and R$_3$ are methyl or ethyl and x and y are integers having a sum in the range of about 3 to about 60.

4. The method of claim 1 wherein x is an integer from 0 to about 10.

5. The method defined in claim 4 wherein said bactericidal agent is comprised of glyoxal, succinaldehyde, hexa-2,4-dienal, methylglutaraldehyde or adipaldehyde or mixtures thereof.

6. The method defined in claim 4 wherein said bactericidal agent is glyoxal.

7. The method defined in claim 4 wherein said bactericidal agent is added to said solution in an amount providing a bacterial agent concentration level in said solution of between about 5 wppm and about 5,000 wppm.

8. The method defined in claim 4 wherein said bactericidal agent is added to said solution in an amount providing a bactericidal agent concentration level in said solution of between about 10 wppm and about 1000 wppm.

9. The method defined in claim 4 wherein said bactericidal agent is added to said solution in an amount providing a bactericidal agent concentration level in said solution of between about 100 wppm and about 300 wppm.

10. The method defined in claim 4 further comprising the step of, after said hydrogen sulfide removal system has been reconditioned, adding amounts of said bactericidal agent sufficient to prevent recontamination of said system by said sulfur-feeding bacteria.

11. The method defined in claim 10 wherein said additional bactericidal agent is added to said solution at a rate so as to maintain a concentration of said bactericidal agent in said solution of between about 10 wppm and about 1000 wppm.

12. The method defined in claim 10 wherein said bactericidal agent concentration is maintained between about 100 wppm and about 300 wppm.

13. A composition comprising:

a regenerable aqueous washing solution capable of absorbing hydrogen sulfide and converting the hydrogen sulfide to elemental sulfur comprising at least one multivalent metal and at least one metal complexing agent; and an aliphatic dialdehyde of the form:

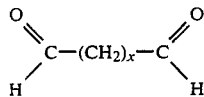

where x is an integer.

14. The composition of matter defined in claim 13 wherein said integer x is an integer from 0 to about 10.

15. The composition of claim 14 wherein the multivalent metal is vanadium, iron, or combinations thereof.

16. The composition of claim 15 wherein the metal complexing agent is a water-soluble salt of 9, 10, anthraquinone disulfonic acid, a water-soluble naphthaquinone sulfonate, a water-soluble carboxylate or combination thereof.

17. The composition of matter defined in claim 16 wherein said aqueous liquid further contains a surfactant.

18. A composition of matter comprising an aqueous liquid comprising ADA, vanadium ions, carbonate ions and an aliphatic dialdehyde of the form:

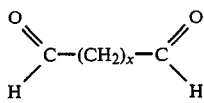

where x is an integer from 0 to about 10.

* * * * *